(12) United States Patent
Pilz et al.

(10) Patent No.: US 12,503,095 B2
(45) Date of Patent: Dec. 23, 2025

(54) DRIVE UNIT MOUNT SNUBBING DETECTOR AND LOGIC CONTROL FOR NOISE AND VIBRATION

(71) Applicant: Rivian IP Holdings, LLC, Plymouth, MI (US)

(72) Inventors: Fernando Figueroa Pilz, Irvine, CA (US); Mayuresh Sanjay Pathak, Windsor (CA); Andrew Trevor Belk, Watsonville, CA (US); Christopher R. Conklin, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 384 days.

(21) Appl. No.: 18/308,546

(22) Filed: Apr. 27, 2023

(65) Prior Publication Data

US 2024/0359679 A1 Oct. 31, 2024

(51) Int. Cl.
*B60W 10/08* (2006.01)
*B60L 15/20* (2006.01)
*B60W 20/11* (2016.01)

(52) U.S. Cl.
CPC ......... *B60W 10/08* (2013.01); *B60L 15/2045* (2013.01); *B60W 20/11* (2016.01); *B60L 2240/423* (2013.01)

(58) Field of Classification Search
None
See application file for complete search history.

(56) References Cited

U.S. PATENT DOCUMENTS

2019/0291709 A1* 9/2019 Liu ..................... B60W 10/06
2020/0262286 A1* 8/2020 Ito ........................ B60K 5/12

\* cited by examiner

*Primary Examiner* — Hitesh Patel
*Assistant Examiner* — Wenyuan Yang
(74) *Attorney, Agent, or Firm* — BAKERHOSTETLER

(57) ABSTRACT

A vehicle management system includes a torque control generates torque logic for managing torque output of a drive unit and limiting displacement of a bushing that couples the drive unit to a vehicle. A measuring device monitors the bushing to measuring displacement of the bushing while the drive unit is operating. The measuring device can provide data (e.g., displacement data), indicating displacement of the bushing, to the vehicle management system. Based on a comparison between the displacement of the bushing and a threshold displacement, the torque output generates the torque logic used to manage the torque output of the drive unit.

14 Claims, 14 Drawing Sheets

DRIVE UNIT MOUNT SNUBBING DETECTOR AND LOGIC CONTROL FOR NOISE AND VIBRATION

INTRODUCTION

This application is directed to monitoring displacement of a bushing used with a drive unit. Based on the displacement, a torque control can provide torque logic (e.g., torque command) to the drive unit, which may limit or reduce the propulsion provided by the drive unit. By limiting/reducing the propulsion, the resultant torque output by the drive unit may also be limited/reduced, thus reducing a force on the bushing to reduce displacement of the bushing and leading to better noise and vibration performance.

SUMMARY

In accordance with one or more aspects of the disclosure, a vehicle management system is described. The vehicle management system may include a measuring device that measures a displacement of a bushing coupled to a drive unit. The vehicle management system may include may further include a torque control configured to: obtain, from the measuring device, first displacement data corresponding to the displacement of the bushing. The torque control may further be configured to in response to the first displacement data indicating the displacement is at or above a threshold displacement, output, based on the first displacement data, torque logic to the drive unit.

The torque control may further be configured to generate, based on the first displacement data, an analytical model of the bushing. The torque control may further be configured to generate adjust, based on the analytical model, the torque logic.

The torque control may further be configured to store the first displacement data as historical displacement data. The torque control may further be configured to obtain, from the measuring device, second displacement data. The torque control may further be configured to update, based on the historical displacement data and the second displacement data, the analytical model. The torque control may further be configured to update, based on the updated analytical model, the torque logic.

The torque control may further be configured to obtain a characteristic of the bushing. The torque control may further be configured to generate the analytical model based on the characteristic.

The measuring device may include a strain gauge. The measuring device may include a camera configured to capture an image of the bushing. The measuring device may include a coil coupled to the bushing, and a magnet. Further, relative movement between the coil and the magnet may induce an electrical current in the coil, and the first displacement data may include a value of the induced electrical current. The measuring device may include actuator configured to measure the displacement of the bushing, and generate the first displacement data based on the displacement. The measuring device may include a sensor that monitors a movement of the drive unit, and the displacement of the bushing may be determined based on the movement. The vehicle management system may be implemented in a vehicle.

In accordance with one or more other aspects of the disclosure, a vehicle is described. The vehicle may include a front drive unit. The vehicle may further include a rear drive unit. The vehicle may further include a first bracket coupled to the front drive unit. The first bracket may carry a first bushing. The vehicle may further include a second bracket coupled to the rear drive unit. The second bracket may carry a second bushing. The vehicle may further include a first measuring device that measures a first displacement of the first bushing. The vehicle may further include a second measuring device that measures a second displacement of the second bushing. The vehicle may further include a torque control configured to obtain the first displacement and the second displacement. The torque logic may further be configured to determine, based on the first displacement, a first torque logic for the front drive unit. The torque logic may further be configured to determine, based on the second displacement, a second torque logic for the rear drive unit.

The torque logic may further be configured to in response to the first displacement being at or above a threshold displacement, provide the first torque logic to the front drive unit. The torque logic may further be configured to in response to the second displacement being at or above the threshold displacement, provide the second torque logic to the rear drive unit.

The vehicle may further include a first wheel coupled to the front drive unit. The first torque logic may cause the front drive unit to operate the first wheel. The vehicle may further include a second wheel coupled to the rear drive unit. The second torque logic may cause the rear drive unit to operate the second wheel. The first torque logic may cause a first torque to the first wheel, and the second torque logic may cause a second torque to the second wheel. The first torque may be different from the second torque.

In accordance with one or more other aspects of the disclosure, a method for managing a vehicle is described. The method may include monitoring a displacement of a bushing. The method may further include comparing the displacement with a threshold displacement. The method may further include in response to the displacement being at or above the threshold displacement, outputting torque logic to a drive unit.

The torque logic may cause operating of the drive unit to maintain the bushing at or below the threshold displacement. The torque logic may include a torque output to a wheel coupled to the drive unit. Monitoring the displacement may include measuring, by a measuring device, the displacement.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
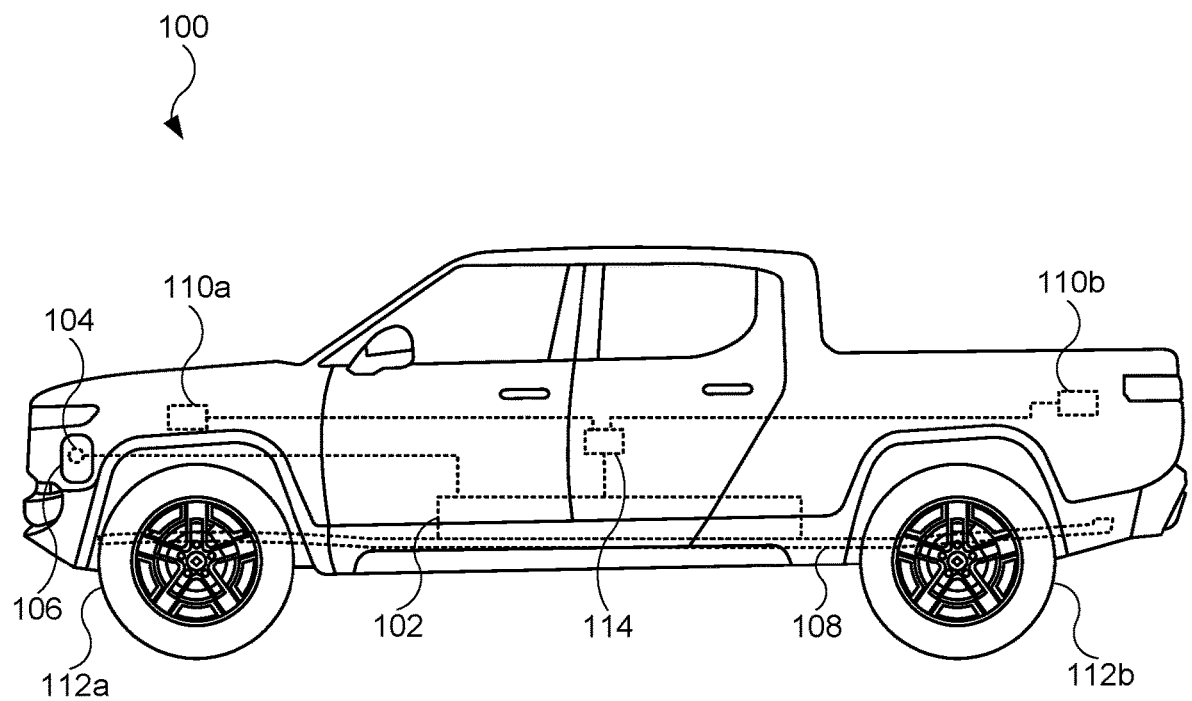
FIG. 1 illustrates an exemplary embodiment of a vehicle, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to a vehicle management system for managing noise, vibration, and harshness (NVH) in a vehicle by monitoring bushings used with drive units. Bushings described herein may include an inner and outer metal ring and a rubber compound (as a non-limiting example) in between the two metal rings and are used to secure and isolate vibration from the drive units to the frame or chassis of the vehicle. In one or more implementations, a measuring device (or devices) monitor(s) each bushing and measures displacement (e.g., elongation, compression, movement due to shear forces) of the bushing. The measuring device(s) can provide data, in the form of displacement data, to a torque control of the vehicle management system.

The torque control can use the data for multiple applications. For example, the torque control can use the data as feedback to determine whether to provide torque logic to manage the drive units. During propulsion of the vehicle by one or more drive units, a force (e.g., torque) may be applied to bushings. The force applied to the bushings causes the bushings to undergo displacement relative to its original position and causes the rubber compound of the bushing to compress, elongate or shear. When the displacement of the rubber compound within the bushing is at or above a threshold linear displacement (e.g., snubbing limit), the force applied to the bushings increases rapidly (e.g., exponentially). Beneficially, however, using data from the measuring device(s) as feedback, the torque logic provided by the torque control includes instructions designed to limit output (e.g., propulsion) of the drive units, thus reducing the displacement of the bushing and maintaining the bushing below the threshold displacement. Beneficially, by reducing displacement of the bushing, the vehicle management system can reduce NVH, as well as reduce wear or fatigue on the bushings.

Also, in some examples, components such as struts may be mounted to brackets that hold the bushings. During acceleration of the vehicle, a vehicle management system described herein may provide torque logic to the components, causing the components to stiffen. The resultant stiffening of the components may limit or prevent movement of the brackets, thus limiting or preventing movement of the bushings.

In another example, the torque control of the vehicle management system can use the data to build an analytical model. The vehicle management system can obtain displacement data showing multiple measurements of displacement of the bushing at different time intervals. Additionally, for each instance of measured displacement, the vehicle management system can also obtain the drive unit information, such as the propulsion and torque output, and map the drive unit information to the displacement data. The vehicle management system can use historical displacement data to determine, for example, increased bushing displacement for the same applied torque. Additionally, the vehicle management system can also obtain bushing data, such as bushing stiffness (e.g., stiffness of the rubber compound of the bushing) and bushing diameter. Using displacement data and bushing data, the analytical model can be built. The analytical model can provide information, such as trends related to bushing durability and/or fatigue. The analytical model may provide insight as to which material(s) are best suited for the bushing, when to replace the bushing, and/or how to limit forces (e.g., torque output) applied by the drive unit to the bushing. Beneficially, the vehicle management system can reduce the likelihood of design changes of the vehicle related to changes in the bushings (e.g., changes to bushing diameter and stiffness), as the vehicle management system can manage factors and mitigate issues related to the existing bushings.

The torque control (that provides torque logic) and the analytical model may each lead to increased bushing lifespan, as well as limited NVH in the vehicle. Moreover, the torque control and the analytical model may be used in conjunction as a control loop. For example, the torque control may adjust a torque command under different circumstances based on the lifespan and resultant fatigue on the bushing, as determined by the analytical model.

According to some embodiments, for example as shown in FIG. 1, an example implementation of a movable apparatus takes the form of a vehicle 100. In some embodiments, the vehicle 100 is a sport utility vehicle. In the embodiment shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, a motorcycle, a motorized scooter, or a commercial truck, as non-limiting examples. Still further, other implementations of the vehicle 100 may include sea or air transport vehicles, planes, helicopters, submarines, boats, or drones, as non-limiting examples.

As shown, the vehicle 100 includes a battery pack 102. The battery pack 102 may be coupled (e.g., electrically coupled) to one or more electrical systems of the vehicle 100 to provide power to the one or more electrical systems. The battery pack 102 may include one or more battery modules (not shown in FIG. 1), with each of the one or more battery modules carrying several battery cells. In some embodiments, the battery pack 102 does not include any battery modules and takes the form of a cell-to-pack configuration. Also, the battery cells of the battery pack 102 may include rechargeable battery cells, and accordingly, the battery pack 102 may be referred to as a rechargeable battery pack. In this regard, the vehicle 100 includes a port 104 (e.g., charge port) designed to receive a cable connector (not shown in FIG. 1) that provides power (e.g., AC power) that is converted to DC power to charge the battery pack 102. The port 104 can be accessed by moving a cover 106. The vehicle 100 may include a chassis 108 used to support the battery pack 102 and various other components (not shown in FIG. 1) of the vehicle 100, such as the suspension and differential, as non-limiting examples.

The battery pack 102 may couple to a drive unit 110a and a drive unit 110b. The drive units 110a and 110b may include, for example, a motor, an inverter, a gear box, and a differential. The drive unit 110a is generally located at the front of the vehicle 100, while the drive unit 110b is generally located at the back of the vehicle 100. Accordingly, the drive unit 110a and the drive unit 110b may be referred to as a front drive unit and a rear drive unit, respectively. While two drive units (e.g., drive units 110a and 110b) are shown, the vehicle 100 may include additional drive units. In some embodiments, each of the drive units 110a and 110b is an internal combustion engine. In the embodiment shown in FIG. 1, each of the drive units 110a and 110b is an electric motor. In this regard, the drive unit 110a and the drive unit 110b can use energy (e.g., electrical energy) stored the battery pack 102 for propulsion in order to drive (e.g., rotationally drive) a wheel 112a and a wheel 112b, respectively. The wheels 112a and 112b each represent an additional front wheel and rear wheel, respectively, of the vehicle 100. By driving the wheels 112a and 112b, the vehicle 100 can move in various directions.

Also, the vehicle 100 may further include a vehicle management system 114 designed to provide torque commands to the drive units 110a and 110b. The drive units 110a and 110b may operate in accordance with the torque logic provided by the vehicle management system 114. In this regard, the drive units 110a and 110b can generate, based on the torque logic, a torque output provided to the wheels 112a and 112b, respectively, that dictate the speed at which the vehicle 100 is traveling.

Figure 2:
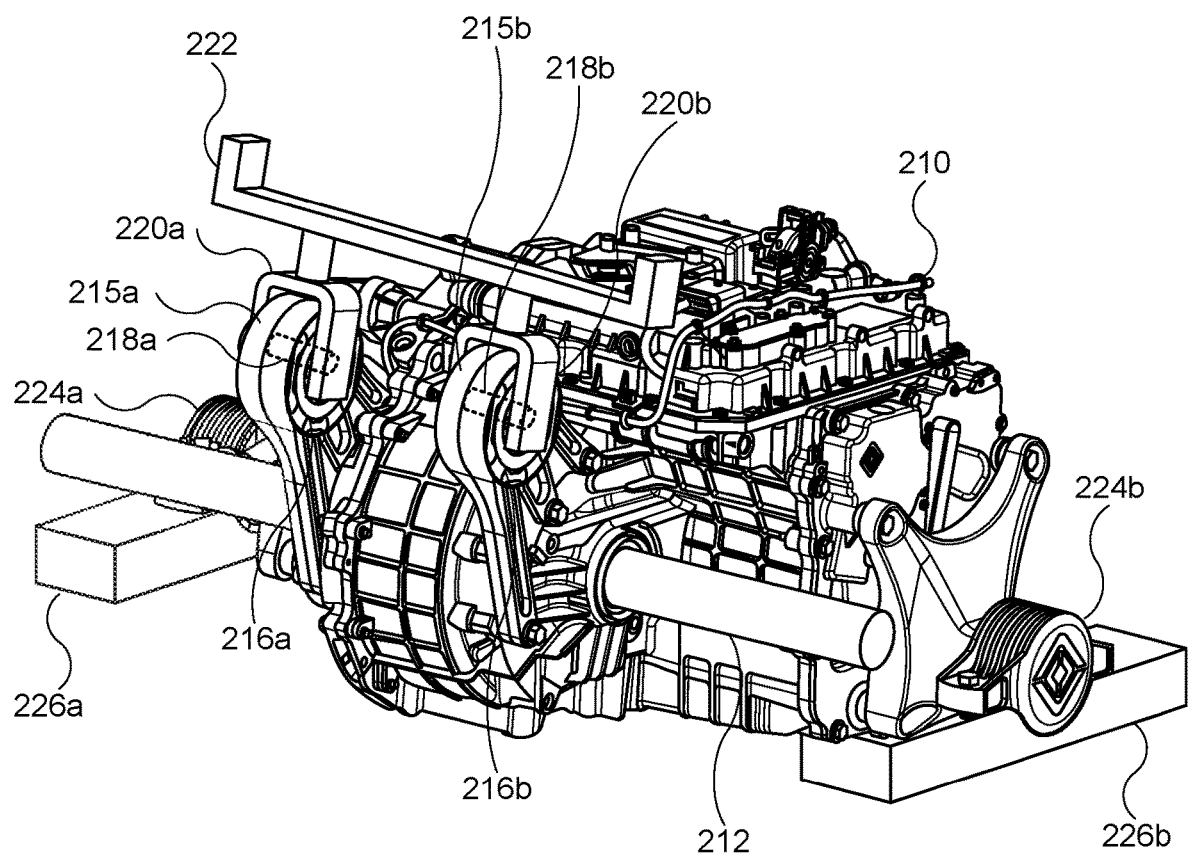
FIG. 2 illustrates a perspective view of a drive unit, in accordance with aspects of the present disclosure.

Referring to FIG. 2, a drive unit 210 is shown. The drive unit 210 may include, for example, a motor, an inverter, a gear box, or a differential, as non-limiting examples. The drive unit 210 can drive (e.g., rotationally drive) a shaft 212 that is coupled to wheels (not shown in FIG. 2).

In order to secure the drive unit 210 to a vehicle (e.g., vehicle 100, shown in FIG. 1), several components are used. For example, a bracket 215a and a bracket 215b extend from the drive unit 210. The bracket 215a and the bracket 215b each carry a bushing 216a and a bushing 216b, respectively. In some embodiments, the bushings 216a and 216b include a rubber compound. However, other materials are possible. Each of the bushings 216a and 216b include an opening (not shown). The openings allow a bolt 218a and a bolt 218b to pass through the bushing 216a and the bushing 216b, respectively. The bushings 216a and 216b can reduce NVH during operation of the drive unit 210. However, the applied torque to the shaft 212 by the drive unit 210 can impact the bushings 216a and 216b. For example, the bushings 216a and 216b can sense an applied torque during operation of the drive unit 210, and react by displaced. This will be further discussed below.

The bolt 218a and the bolt 218b connect to a clevis 220a and a clevis 220b, respectively. The clevises 220a and 220b are connected to a crossmember 222, which can be secured to a frame (not shown) of a vehicle. Additionally, the drive unit 210 may include a mount 224a and a mount 224b, each of which can be secured to a subframe 226a and a subframe 226b, respectively.

Figure 3:
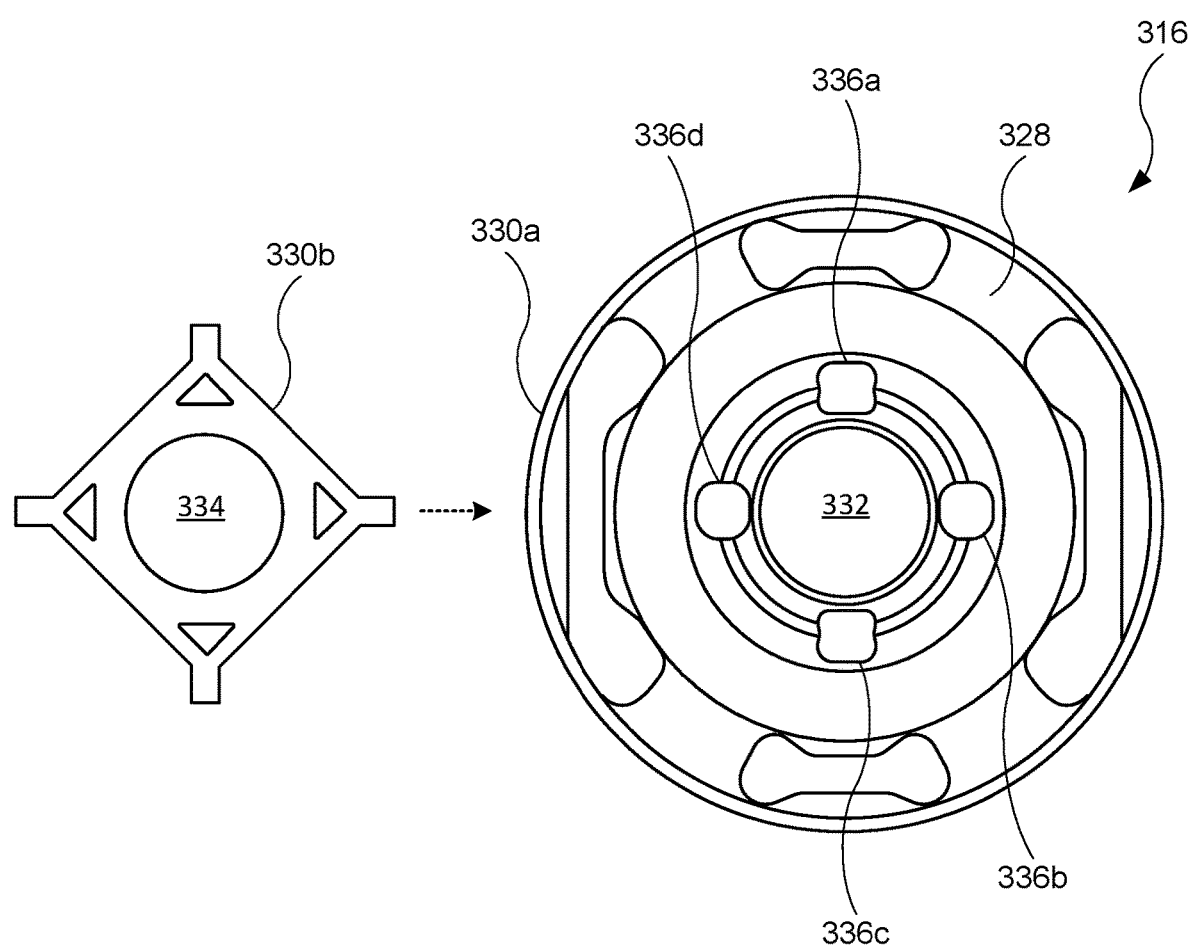
FIG. 3 illustrates a plan view of a bushing, in accordance with aspects of the present disclosure.

Referring to FIG. 3, a bushing 316 is shown. The bushing 316 may include a compound 328. In some embodiments, the compound 328 is a rubber compound. However, another material or materials with elastic properties may be used. The bushing 316 may further include a ring 330a (e.g., outer ring) positioned on an outer surface of the compound 328. The bushing 316 may further include a ring 330b (e.g., inner ring) that can be positioned in an opening 332, representing an inner surface of the compound 328. The ring 330b includes an opening 334 designed to receive a bolt (e.g., bolt 218a shown in FIG. 2). Each of the rings 330a and 330b may include a metal (e.g., steel, aluminum, metal alloy). Further, the compound 328 includes several openings, such as an opening 336a, an opening 336b, an opening 336c, and an opening 336d. Each of the openings 336a, 336b, 336c, and 336d can receive a portion of the ring 330b. As a result, the compound 328 can retain and limit/constrain movement of the ring 330b.

The bushing 316 shown in FIG. 3 is in a baseline, or neutral, position. In the baseline position, the bushing 316 includes a cylindrical, or generally cylindrical, body with a circular cross section. Also, in the baseline position of the bushing 316, no other forces, other than gravity, are acting upon the bushing 316, and other than gravity, the rings 330a and 330b provide some force (through contact) with the compound 328. However, under certain forces, the position of the bushing 316 may change.

Figure 4A:
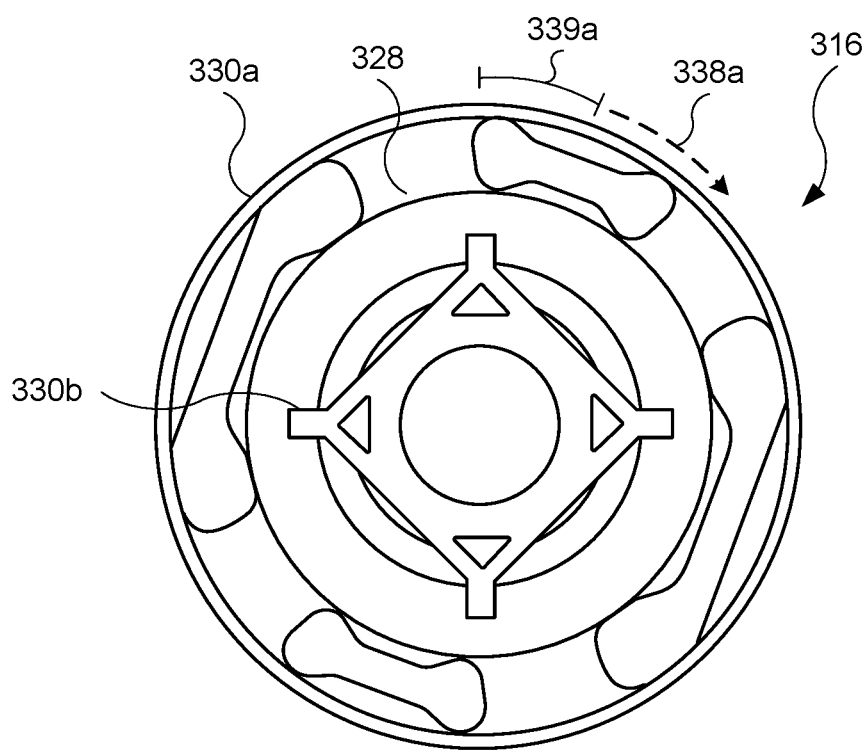
FIGS. 4A and 4B illustrate a plan view of the bushing shown in FIG. 3, further showing the bushing under an applied force, in accordance with aspects of the present disclosure.
Figure 4B:
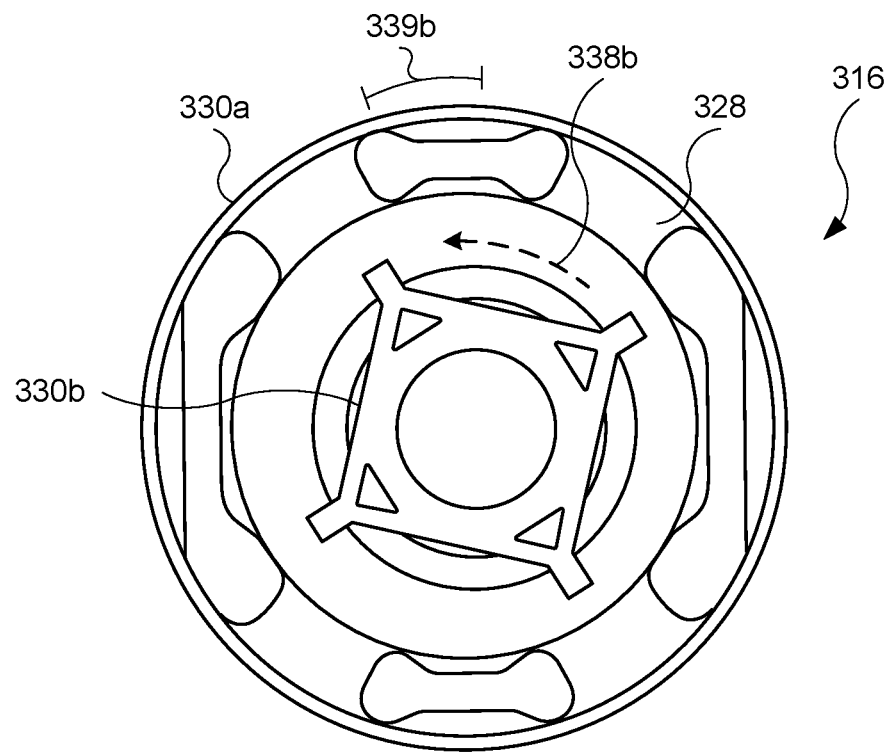

Referring to FIGS. 4A and 4B, a force is applied to the bushing 316. The force may be applied to the bushing 316 during operation of a drive unit (e.g., drive unit 210 shown in FIG. 2). As shown in FIG. 4A, a force in the direction of an arrow 338a may include a torque that causes the ring 330a to move by a distance 339a relative to the ring 330b. In order for the relative movement to occur, the compound 328 can be displaced, or deflected, and may provide a counterforce to maintain the ring 330b in the same, or substantially the same, position. Conversely, FIG. 4B shows a force in the direction of an arrow 338b that is generally opposite in direction as that of the arrow 338a shown in FIG. 4A. The force along the arrow 338b may include a torque causes the ring 330b to move by a distance 339b relative to the ring 330b. The compound 328 can be displaced and may provide a counterforce to maintain the ring 330a in the same, or substantially the same, position. Accordingly, the bushing 316, and in particular the compound 328, can be displaced in multiple directions. Further, the bushing 316, including the compound 328, can deform and at least partially change shape (e.g., from the baseline position shown in FIG. 3). Beneficially, through displacement and change in shape, the compound 328 also dampens or isolates noise and vibration. It should be noted that in FIGS. 4A and 4B, the displacement of the compound 328 may occur in the opposite direction than what is shown.

The displacement may refer to distance traveled by the compound 328. For example, referring to FIG. 4A, the displacement of the compound 328 corresponds to a distance at or near the outer surface of the compound 328 in proximity to the ring 330a. Moreover, the distance is compared to the baseline (e.g., zero displacement) of the compound 328 of the bushing 316 shown in FIG. 3. Based on characteristics such as the shape, material makeup, and the stiffness, the compound 328 is specified or rated for a maximum applied force. In this regard, the displacement of the compound 328 should be limited to the specified maximum applied force in order to for the bushing 316 to limit NVH, as well as to extend the lifespan of the bushing 316.

Figure 5:
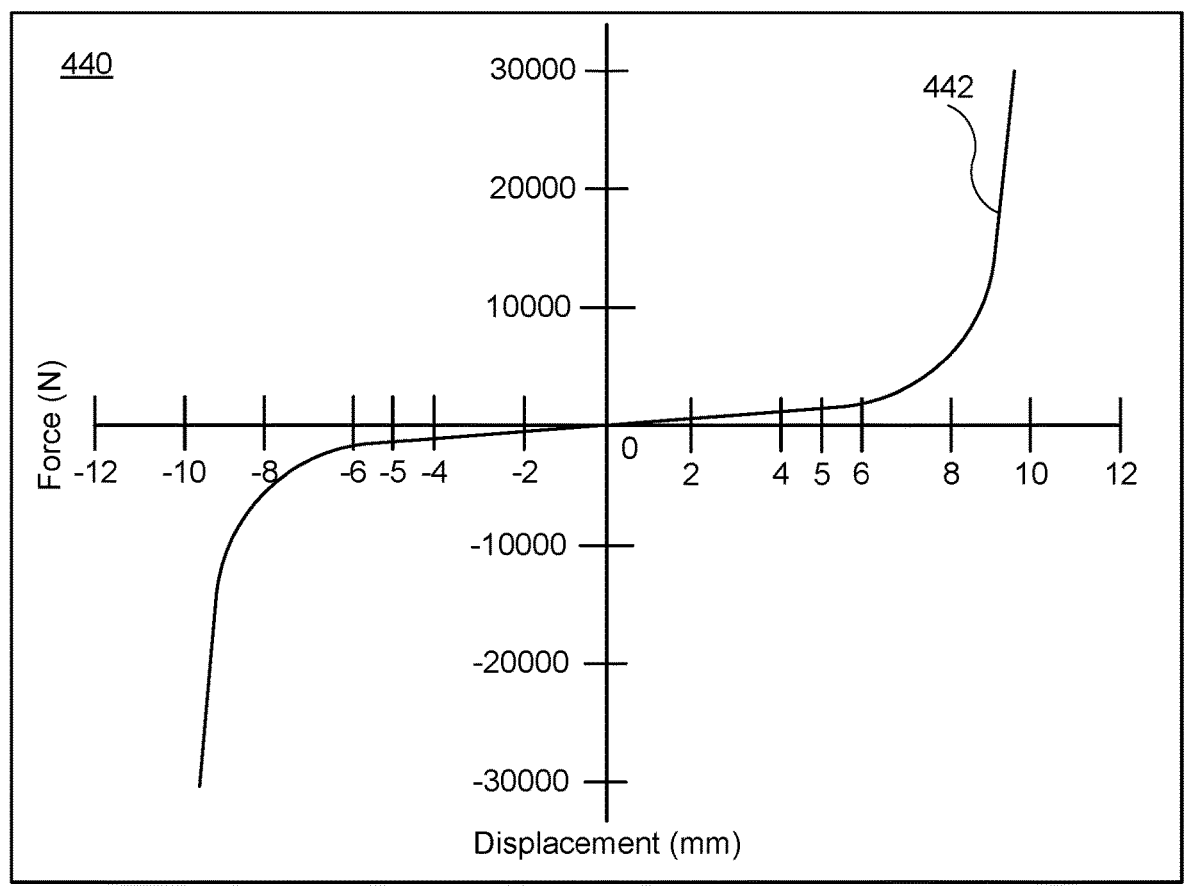
FIG. 5 illustrates a graph showing force versus displacement for a bushing, in accordance with aspects of the present disclosure.

Referring to FIG. 5, a graph 440 shows a plot 442 of force (in Newtons, or N) vs. displacement (in millimeters, or mm) of a bushing. The plot 442 shows the force (e.g., torque) applied to a bushing described herein for a given displacement of the bushing. The positive X—and Y-axes represent a displacement and force, respectively, in one direction, and the negative X—and Y-axes represent a displacement and force, respectively, in another, opposite direction.

As shown by the plot 442, when the displacement is between −5 mm and +5 mm, the force applied to the bushing is linear, or approximately linear. However, as further shown by the plot 442, when the displacement is beyond −5 mm and beyond +5 mm (e.g., less than −5 mm or greater than +5 mm), the force applied to the bushing increases exponentially. Accordingly, when the displacement of the bushing (e.g., the compound of the bushing) is greater than 5 mm in either direction, the force applied to the bushing rapidly increases such that the applied force may exceed, including substantially exceed, the specified maximum applied force for the bushing. In this example, −5 mm and +5 mm represent the snubbing limit of a bushing. The snubbing limit may refer to a threshold displacement, or maximum displacement, of a bushing just prior to the force applied to the bushing exponentially increasing.

In order to limit the force applied to bushings in a vehicle, the bushings may be monitored. For example, during operation of a drive unit, the displacement of the bushing can be measured. Based on the measured displacement, the applied torque may be determined. Moreover, the torque output provided by the drive unit can be determined and can correlate with the applied force that causes the displacement of the bushing. Using this information, a relationship between torque output of one or more drive units and force (e.g., torque) to the bushings can be determined.

Figure 6:
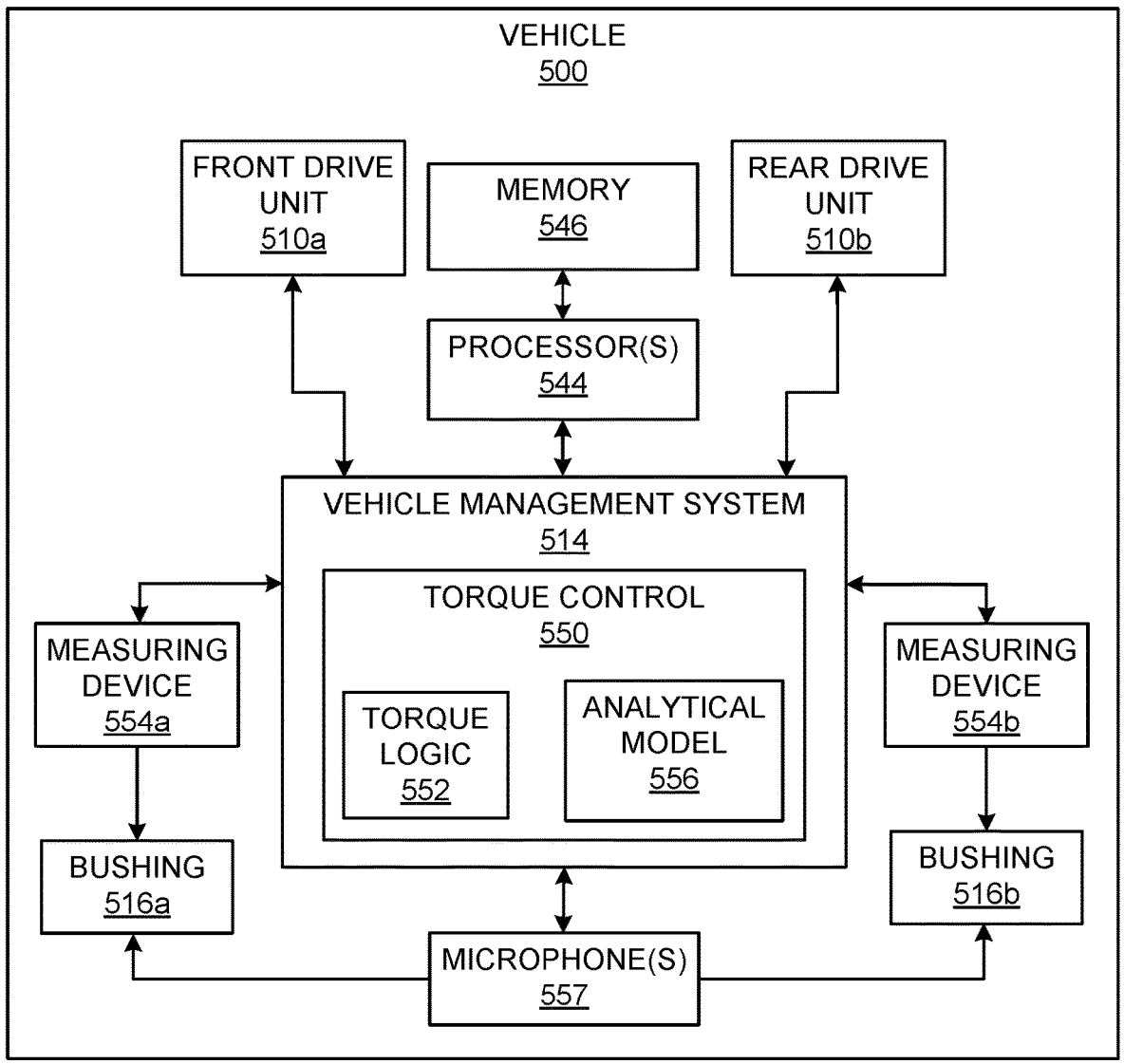
FIG. 6 illustrates a block diagram of a vehicle, in accordance with aspects of the present disclosure.

Referring to FIG. 6, a block diagram of a vehicle 500 is shown. The features shown and described herein for the vehicle 500 may be applicable to other vehicles shown and/or described herein. As shown, the vehicle 500 includes a front drive unit 510a and a rear drive unit 510b, each of which can be operated by a vehicle management system 514 (discussed further below) of the vehicle 500. The vehicle 500 may further include a bushing 516a (representative of one or more bushings) used with the front drive unit 510a. The vehicle 500 may further include a bushing 516a (representative of one or more bushings) used with the rear drive unit 510b.

The vehicle 500 further includes one or more processors 544. The one or more processors 544 may include processing circuitry that takes the form of a central processing unit, one or more microcontrollers, one or more micro electromechanical system (MEMS) controllers, or a combination thereof, as non-limiting examples. The vehicle 500 further includes memory 546. The memory 546 may include read-only memory (ROM), random access memory (RAM), or a combination thereof. The memory 546 may store instructions that are executable by the one or more processors 544.

The vehicle management system 514 is designed to monitor the bushings 516a and 516b and manage the front drive unit 510a and the rear drive unit 510b based on monitoring the bushings 516a and 516b. The vehicle management system 514 may include a torque control 550 designed to generate and provide torque logic 552 to the front drive unit 510a and the rear drive unit 510b. The torque logic 552 may include one or more torque commands provided as instructions to the front drive unit 510a and the rear drive unit 510b that instructs the front drive unit 510a and the rear drive unit 510b to generate a specified torque output, in accordance with the instructions, to propel the vehicle by driving wheels (not shown) of the vehicle 500. Also, the vehicle management system 514 implemented in hardware (e.g., by the one or more processors 544). Alternatively, or in combination, the vehicle management system 514 may be implemented in software and stored on the memory 546.

Additionally, the vehicle 500 may include a measuring device 554a (representative of one or more measuring devices) designed to measure displacement of the bushing 516a. Additionally, the vehicle 500 may include a measuring device 554b (representative of one or more measuring devices) designed to measure displacement of the bushing 516b. Generally, the vehicle 500 may include the same number of measuring devices as bushings. However, multiple measuring devices (further described below) may be used to monitor a single bushing. The measuring device 554a and the measuring device 554b can provide data (e.g., displacement data) to the vehicle management system 514. Based on the data, the torque control 550 can generate torque logic 552 used to adjust the torque output of the front drive unit 510a and the rear drive unit 510b. For example, the displacement of the bushings 516a and 516b may be compared with a baseline, or neutral, position of a bushing (e.g., as shown in FIG. 3). When the data indicates the bushings 516a and 516b are at or above the threshold displacement (e.g., snubbing limit), the torque control 550 generates the torque logic 552, which includes instructions provided to the front drive unit 510a and the rear drive unit 510b to adjust (e.g., decrease or reduce) the respective torque output, thus reducing the rotational force provided to the wheels and decreasing the speed of the vehicle 500. Beneficially, the displacement of the bushing 516a and 516b is reduced to a displacement at below the threshold displacement. Accordingly, using the torque logic 552, the torque control 550 can maintain the front drive unit 510a and the rear drive unit 510b to within a motion envelop such that each of the front drive unit 510a and the rear drive unit 510b does not exceed a specified torque output associated with a threshold displacement of the bushings 516a and 516b.

The torque logic 552 may include individual or separate instructions for the front drive unit 510a and the rear drive unit 510b. For example, when the measuring device 554a provides data to the torque control 550 indicating the bushing 516a is at or above the threshold displacement but the measuring device 554b provides data to the torque control 550 indicating the bushing 516b is below the threshold displacement, the torque control 550 may generate torque logic 552 with instructions provided only to the front drive unit 510a to adjust (e.g., reduce) the torque output of the front drive unit 510a. In another example, when each of the measuring device 554a and measuring device 554b provides data to the torque control 550 indicating the bushing 516a and the bushing 516b, respectively, is at or above the threshold displacement, the torque control 550 may generate torque logic 552 with instructions provided only to one of the front drive unit 510a and the rear drive unit 510b to adjust (e.g. reduce) the torque output, provided the adjustment in the torque output (to one of the front drive unit 510a and the rear drive unit 510b) causes each of the bushing 516a and 516b to return below the respective threshold displacement.

In some implementations, the vehicle management system 514 is activated in certain situations. For example, when the vehicle 500 is placed on cruise control (e.g., automated consistent speed) or certain drive modes (e.g. comfort mode), the torque control 550 is activated to generate torque logic 552 to manage the front drive unit 510a and the rear drive unit 510b, thus, the vehicle management system 514 may be implemented based upon predetermined conditions.

Additionally, the data obtained by the one or more processors 544 from the measuring devices 554a and 550b may be used in different applications. For example, the displacement data can be used by the torque control 550 to generate an analytical model 556 of the bushings 516a and 516b. The analytical model 556 may obtain torque output data of the front drive unit 510a and rear drive unit 510b and the result displacement data of the bushing 516a and the bushing 516b, respectively. The obtained data (e.g., torque output data) may be in real time, or near real time. Alternatively or in combination, the obtained data may include historical data representing historical torque output (e.g., from instructions provided in the torque logic 552) and historical displacement data of the bushings 516a and 516b (obtained by the prior measurements of the measuring device 554a and 554b). The historical displacement data of the bushings 516a and 516b may be stored on the memory 546. In addition to displacement data and torque output data, the analytical model 556 may obtain characteristic data that includes a characteristic (or characteristics) of the bushings 516a and 516b, such as the dimensions (e.g., bushing diameter), material makeup (e.g., material of the compound of the bushings 516a and 516b), and/or bushing stiffness of the bushings 516a and 516b. The characteristic data of the bushings 516a and 516b may be stored on the memory 546 by writing the information to the memory 546 or through software updates obtained by the vehicle 500.

Using the aforementioned data, the analytical model 556 can characterize changes in displacement of the bushing 516a and 516b over time, which can be used to determine or predict durability and fatigue of the bushings 516a and 515b. Additionally, the analytical model 556 may be used a tool to predict a torque output by the front drive unit 510a and the rear drive unit 510b that maintains the bushings 516a and 516b below their respective threshold displacements. In this regard, using the analytical model 556, the torque control 550 can adjust the torque logic 552, and accordingly adjust the instructions (from the torque logic 552) to the front drive unit 510a and the rear drive unit 510b. This may include, for example, providing instructions that reduce the torque output of the front drive unit 510a and the rear drive unit 510b earlier (e.g., at lower respective torque outputs) as time advances, based on wear (e.g., actual or predicted) of the bushing 516a and the bushing 516b as determined using the analytical model 556. Moreover, the torque control 550 can use the analytical model 556 can adjust (e.g., decrease) the threshold displacement of the bushings 516a and 516b over time. For example, if the analytical model 556 indicates wear or fatigue one or both of the bushings 516a and 516b, the torque control 550, using the analytical model 556 indicating the wear or fatigue, can reduce the threshold displacement. The reduced threshold displacement may cause the torque control 550 to generate the torque logic 552 with instructions to front drive unit 510a and the rear drive unit 510b to reduce the torque output sooner, or at relatively lower speeds of vehicle 500, as compared to prior instances of less wear or fatigue of the bushings 516a and 516b.

Additionally, the analytical model 556 can be stored on the memory 546. In this regard, the vehicle management system 514 may update (including continuously update) a prior version of the analytical model 556 based on additionally obtained data (e.g., additional, subsequent displacement data from the measuring devices 554a and 554b, additional torque output from the front drive unit 510a and the rear drive unit 510b and its related effect on the displacement of the bushings 516a and 516b), and save the analytical model 556 in the updated form on the memory 546. By saving a current (e.g., most recent) version of the analytical model 556, the analytical model 556 is not lost when the vehicle 500 is out of use (e.g., turned off) and can later be updated when the vehicle 500 is again in use (e.g., turned on). Beneficially, the analytical model 556 can be updated to increase accuracy and better reflect current conditions of the bushings 516a and 516b. Using the analytical model 556 (including updated analytical models), the torque control 550 can update the torque logic 552 to provide instructions to the front drive unit 510a and rear drive unit 510b to increase the lifespan of the bushings 516a and 516b, and improve (e.g., decrease) NVH in the vehicle 500. As a non-limiting example, updating the torque logic 552 may include adjusting (e.g., lowering) the threshold displacement of the bushing 516a and 516b over time to reflect current conditions of the bushings 516a and 516b. The torque control 550 can use the torque logic 552 as a control loop independent of the analytical model 556. Alternatively, the torque control 550 can combine the torque logic 552 with the analytical model 556 (e.g., as a combined control loop) to track the bushings 516a and 516b.

As an example for determining when to update the analytical model 556, additional (e.g., updated or current) displacement data from the measuring devices 554a and 554b may indicate the bushings 516a and 516b, respectively, are being displaced to a greater degree (e.g., an additional distance). If torque control 550 determines, based on a comparison between the current displacement data and the prior displacement data, that the displacement of the bushings 516a and 516b is at or above a threshold displacement (e.g., between measured displacements of the current and prior displacement data), for the same applied torque by the front drive unit 510a and the rear drive unit 510b, the torque control 550 can update the analytical model 556 to reflect the additional displacement of the bushings 516a and 516b. Using the analytical model 556, the torque logic 552 can also be updated. For example, the torque logic 552 can be updated to provide instructions to the front drive unit 510a and the rear drive unit 510b. This may include providing instructions (from the torque logic 552) that reduce the torque output of the front drive unit 510a and the rear drive unit 510b, thus reducing the displacement of the bushings 516a and 516b.

Also, in some examples, when the data indicates the bushings 516a and 516b are at or above the threshold displacement, the torque control 550 may generate the torque logic 552, which includes instructions provided to the front drive unit 510a and the rear drive unit 510b to adjust (e.g., increase or decrease) the respective torque output. For example, each of the bushings 516a and 516b may include a rubber compound surrounded by rings. Each component of the bushings 516a and 516b may include an associated resonant frequency. During operation of the front drive unit 510a and the rear drive unit 510b, the bushings 516a and 516b may oscillate, or vibrate, at their resonant frequency, causing at least some displacement of the bushings 516a and 516b. Accordingly, the bushings 516a and 516b may oscillate at a relatively higher amplitude, based on the resonant frequency, as compared to oscillation at lower or higher frequencies. In order to monitor frequency of the bushings 516a and 516b, the vehicle 500 may further include one or more microphones 557. Each of the one or more microphone 557 may function as an audio transducer designed to convert soundwaves (e.g., acoustical energy) generated from oscillations of the bushings 516a and 516b, and convert the soundwaves into electrical signals, which can be provided to the vehicle management system 514 as data. The vehicle management system 514 may analyze the frequency of the soundwaves, and compare the frequency with the resonant frequency of at least one respective component of the bushings 516a and 516b. When the vehicle management system 514 determines the bushings 516a and 516b are oscillating at their resonant frequency, the torque control 550 can generate torque logic 552, with the torque logic 552 providing instructions to the front drive unit 510a and the rear drive unit 510b adjust (e.g., increase or decrease) torque output. By increasing or decreasing torque output at the front drive unit 510a and the rear drive unit 510b, the bushings 516a and 516b may oscillate at a frequency other than their resonant frequency, thus reducing overall movement of the bushings 516a and 516b.

For purposes of privacy, the vehicle 500 may further be equipped with a filter used to remove soundwaves detected by the one or more microphones 557 associated with human voice. Thus, users of the vehicle 500 may not be recorded during operation of the vehicle 500. Also, for purposes of safety, the vehicle 500 may further be equipped with roadway data that provides the vehicle 500 with a current roadway (e.g., highway, freeway, street) on which the vehicle 500 is located, as well as speed limit data associated with a speed limit of the current roadway. The vehicle management system 514 can use the roadway data and the speed limit data to manage the torque logic 552. For example, when the torque control 550 generates the torque logic 552 that results in the front drive unit 510a and the rear drive unit 510b increasing the speed of the vehicle 500, the torque control 550 can account for the speed limit when generating the torque logic 552 such that the front drive unit 510a and the rear drive unit 510b do not cause the vehicle 500 to exceed the speed limit.

FIGS. 7-11 show and describe various implementations of measuring devices used to determine displacement of a bushing. The measuring devices shown and described in FIGS. 7-11 are exemplary, non-limiting measuring devices that may be used as one of the measuring devices 554a and 550b shown in FIG. 6. Further, the bushings shown and described in FIGS. 7-11 may include any features shown and/or described herein for a bushing.

Figure 7:
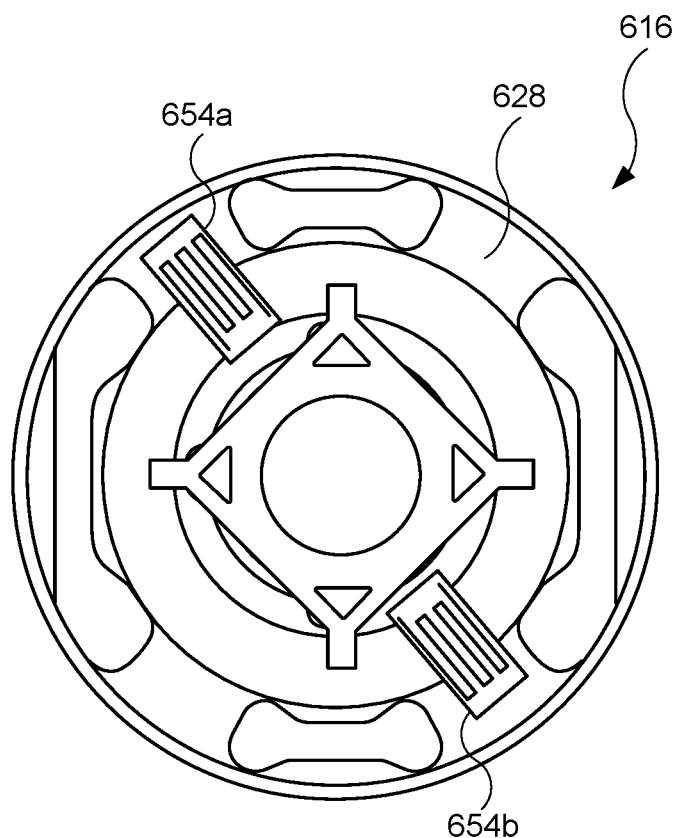
FIG. 7 illustrates an embodiment of a measuring device taking the form of a strain gauge, in accordance with aspects of the present disclosure.

Referring to FIG. 7, a measuring device 654a and a measuring device 654b are positioned on a bushing 616. As shown, the measuring devices 654a and 654b are on a surface of a compound 628 of the bushing 616. However, in some embodiments (not shown), the measuring devices 654a and 654b are embedded in the compound 628. Also, the number of measuring devices may vary. Put another way, a single measuring device may be used, or three or more measuring devices may be used. In some embodiments, each of the measuring devices 654a and 654b is a strain gauge. While not shown, each of the measuring devices 654a and 654b may be coupled to a power source to receive electrical current.

When implemented as a strain gauge, each of the measuring devices 654a and 654b can convert an applied force into a measurable electrical signal. The applied force causing displacement to the compound 628 can also cause displacement of the measuring devices 654a and 654b, leading to a change in strain. The change in strain on the measuring devices 654a and 654b changes the electrical resistance of the measuring devices 654a and 654b, thus changing the electrical signals output by each of the measuring devices 654a and 654b. In this regard, the electrical signals are proportional to the displacement of the measuring devices 654a and 654b. The displacement of the measuring devices 654a and 654b can be equated to the displacement of the compound 628. Thus, a vehicle management system (e.g., vehicle management system 514 in FIG. 6), having torque control, can determine displacement of the compound 628 based on data in the form of electrical signals obtained from the measuring devices 654a and 654b, and use the torque control can generate torque logic using the data from the measuring devices 654a and 654b.

Figure 8A:
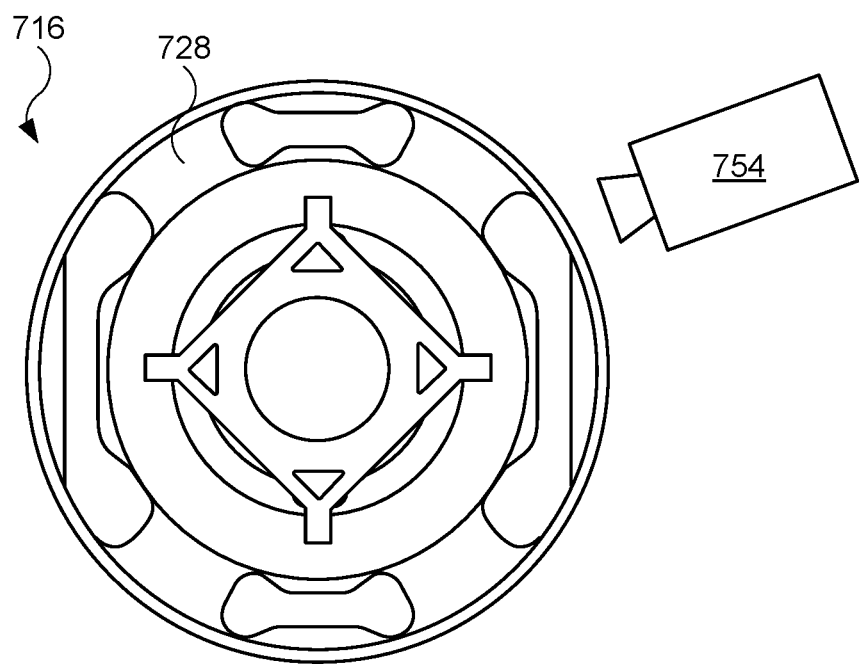
FIGS. 8A and 8B illustrate an alternate embodiment of a measuring device taking the form of a camera used with a digital image correlation (DIC) application, in accordance with aspects of the present disclosure.
Figure 8B:
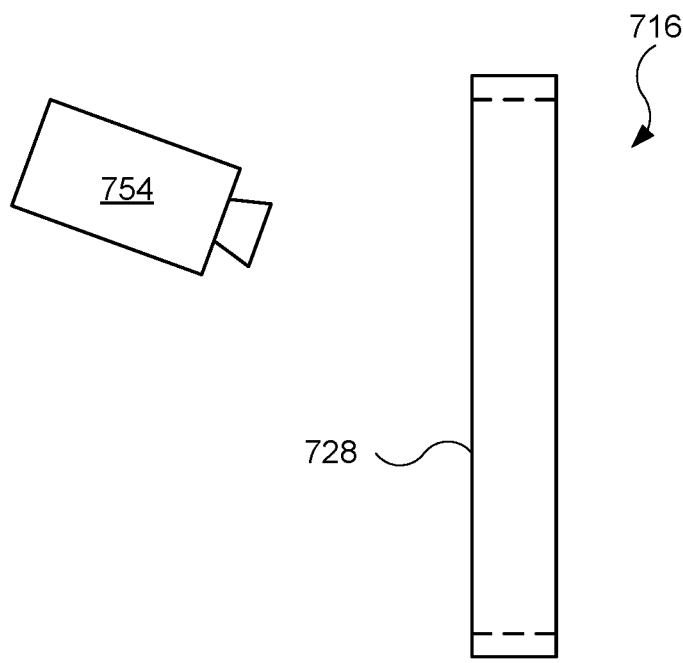

Referring to FIGS. 8A and 8B, a measuring device 754 can externally monitor a bushing 716, and in particular, a compound 728 of the bushing. In some embodiments, the measuring device 754 is an image sensor (e.g., camera). When implemented as an image sensor, the measuring device 754 can be used with a digital image correlation (DIC) application, and capture an image (or images) to produce a two-dimensional strain and displacement map of the bushing 716. The measuring device 754 can provide data (e.g., displacement data) to a vehicle management system (e.g., vehicle management system 514 in FIG. 6), and the vehicle management system can generate, using a torque control (e.g., torque control 550 in FIG. 6), torque logic based on data from the measuring device 754. Beneficially, the measuring device 754 provides a non-contact solution with respect to the bushing 716, and alterations to the bushing 716 are not required.

Figure 9A:
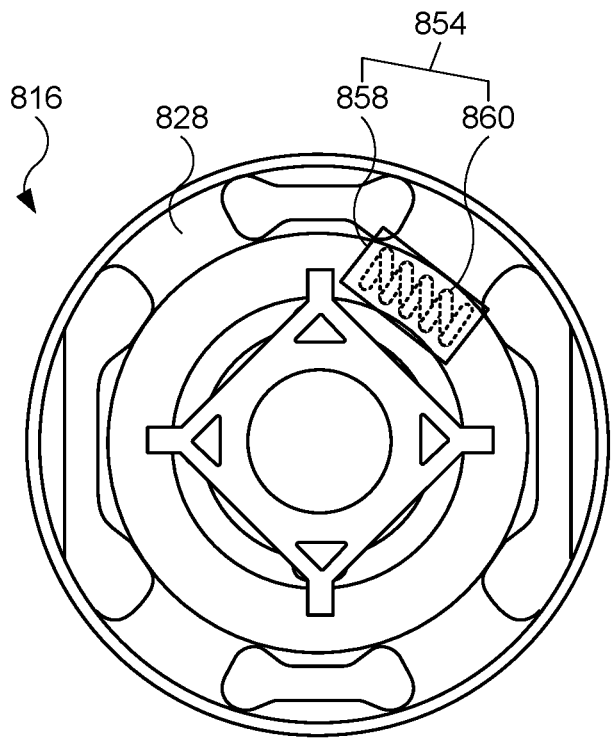
FIGS. 9A and 9B illustrate an alternate embodiment of a measuring device that uses electromagnetic induction, in accordance with aspects of the present disclosure.
Figure 9B:
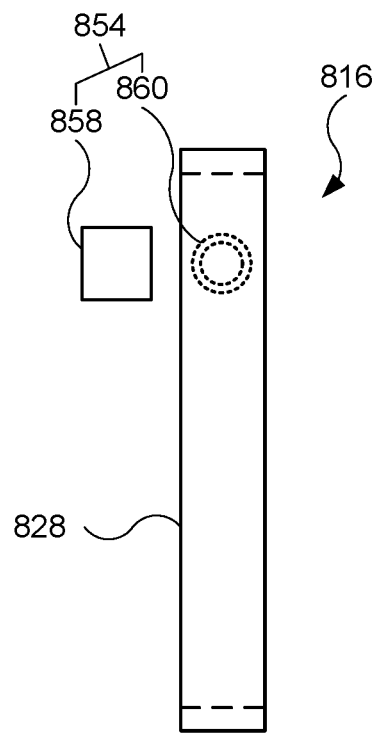

Referring to FIGS. 9A and 9B, a measuring device 854 may include a magnet 858 and a coil 860. In some embodiments, the magnet 858 is a permanent magnet, which may include a rare Earth magnet or a neodymium magnet, as non-limiting examples. In some embodiments, the coil 860 is a metal spring, such as a copper spring as a non-limiting example. As shown, the coil 860 is embedded in a compound 828 of a bushing 816. When a force (e.g., torque) displaces the compound 828, the coil 860 is displaced with the compound 828. Based on relative movement between the magnet 858 and the coil 860, caused by displacement of the compound 828, the magnet 858 induces an electrical current in the coil 860. The induced electrical current may be provided as data (e.g., displacement data in the form of a value in Amperes or milliamperes) to a vehicle management system (e.g., vehicle management system 514 in FIG. 6), and the vehicle management system can generate, using a torque control (e.g., torque control 550 in FIG. 6), torque logic based on the data from the measuring device 854. Although the measuring device 854 is shown as a single measuring device in the compound 828, one or more measuring devices similar to the measuring device 854 may be integrated with the compound 828. Also, the position of the magnet 858 and the coil 860 may be switched such that the magnet 858 is embedded in the compound 828.

Figure 10:
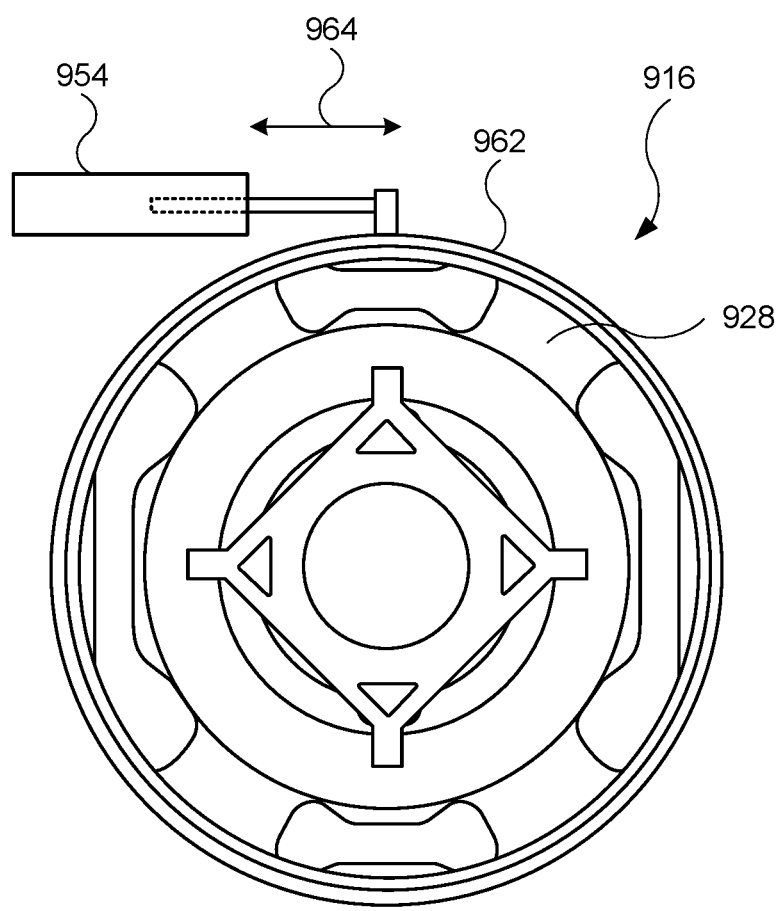
FIG. 10 illustrates an alternate embodiment of a measuring device that takes the form of an actuator, in accordance with aspects of the present disclosure.

Referring to FIG. 10, a measuring device 954 is coupled to a ring 962 that surrounds a bushing 916. In some embodiments, the measuring device 954 is an actuator, such as a linear actuator as a non-limiting example. The bushing 916 may include a compound 928. When a force (e.g., torque) displaces the compound 928, the ring 962 is displaced with the compound 928. The measuring device 954 can track the displacement of the ring 962 in either of the directions of the two-sided arrow 964. The measuring device 954 may provide, as data, the displacement of the ring 962, corresponding to displacement of the compound 928, to a vehicle management system (e.g., vehicle management system 514 in FIG. 6), and the vehicle management system can generate, using a torque control (e.g., torque control 550 in FIG. 6), torque logic based on the data from the measuring device 954.

Figure 11:
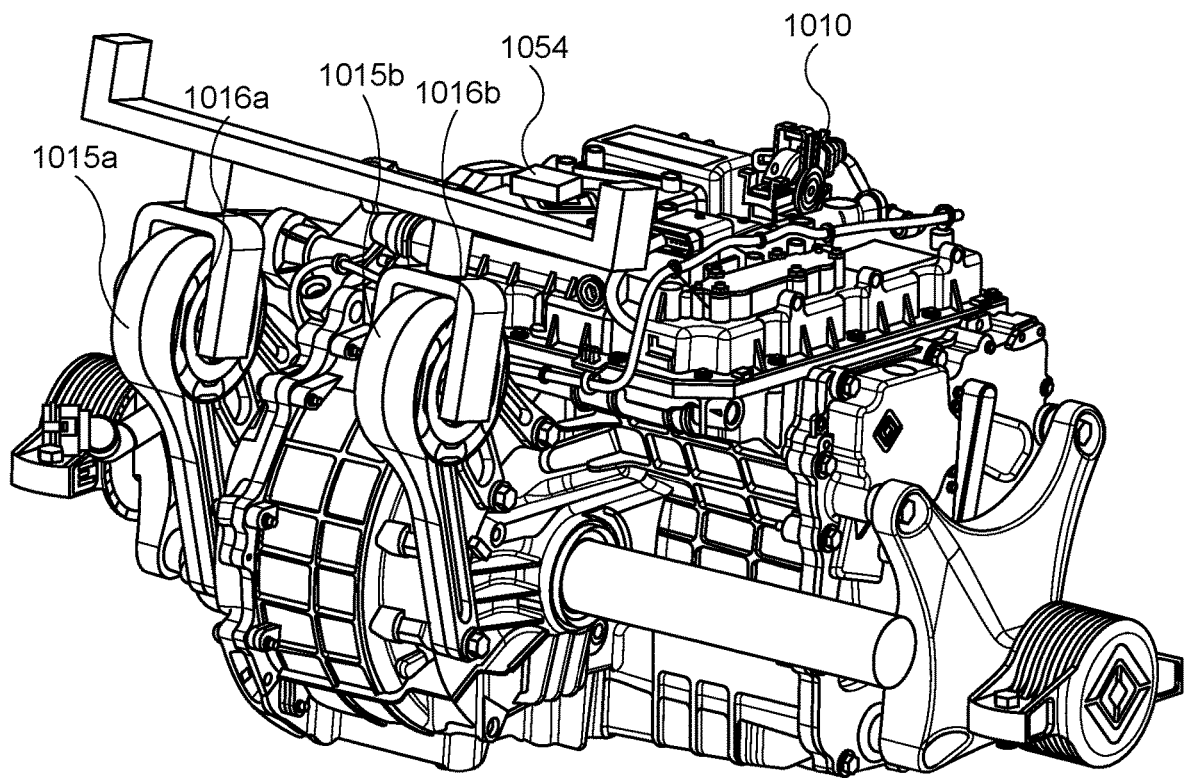
FIG. 11 illustrates an alternate embodiment of a measuring device that takes the form of a level sensor designed to move in response to bushing displacement, a drive unit, in accordance with aspects of the present disclosure.

Measuring devices may indirectly measure displacement of bushings. For example, FIG. 11 illustrates a measuring device 1054 located on a drive unit 1010. In some embodiments, the measuring device 1054 is a six degrees of freedom sensor. By locating the measuring device 1054 on the drive unit 1010, the measuring device 1054 can measure movement and acceleration of the drive unit 1010 along three different axes. Further, the measuring device 1054 may can measure movement and acceleration in the yaw, pitch, and roll axes.

As shown, a bracket 1015a and a bracket 1015b carry a bushing 1016a and a bushing 1016b, respectively. By obtaining data from the measuring device 1054 measuring motion of the drive unit 1010, a vehicle management system (e.g., vehicle management system 514 in FIG. 6) can back calculate and indirectly determine the displacement of the bushings 1016a and 1016b based on the obtained from the measuring device 1054 that monitors movement of the drive unit 1010. Further, the vehicle management system can generate, using a torque control (e.g., torque control 550 in FIG. 6), torque logic based on the indirectly determined displacement of the drive unit 1010. Beneficially, in some instances, the measuring device 1054 is existing component located on the drive unit 1010, and can be multipurposed for bushing management.

Figure 12:
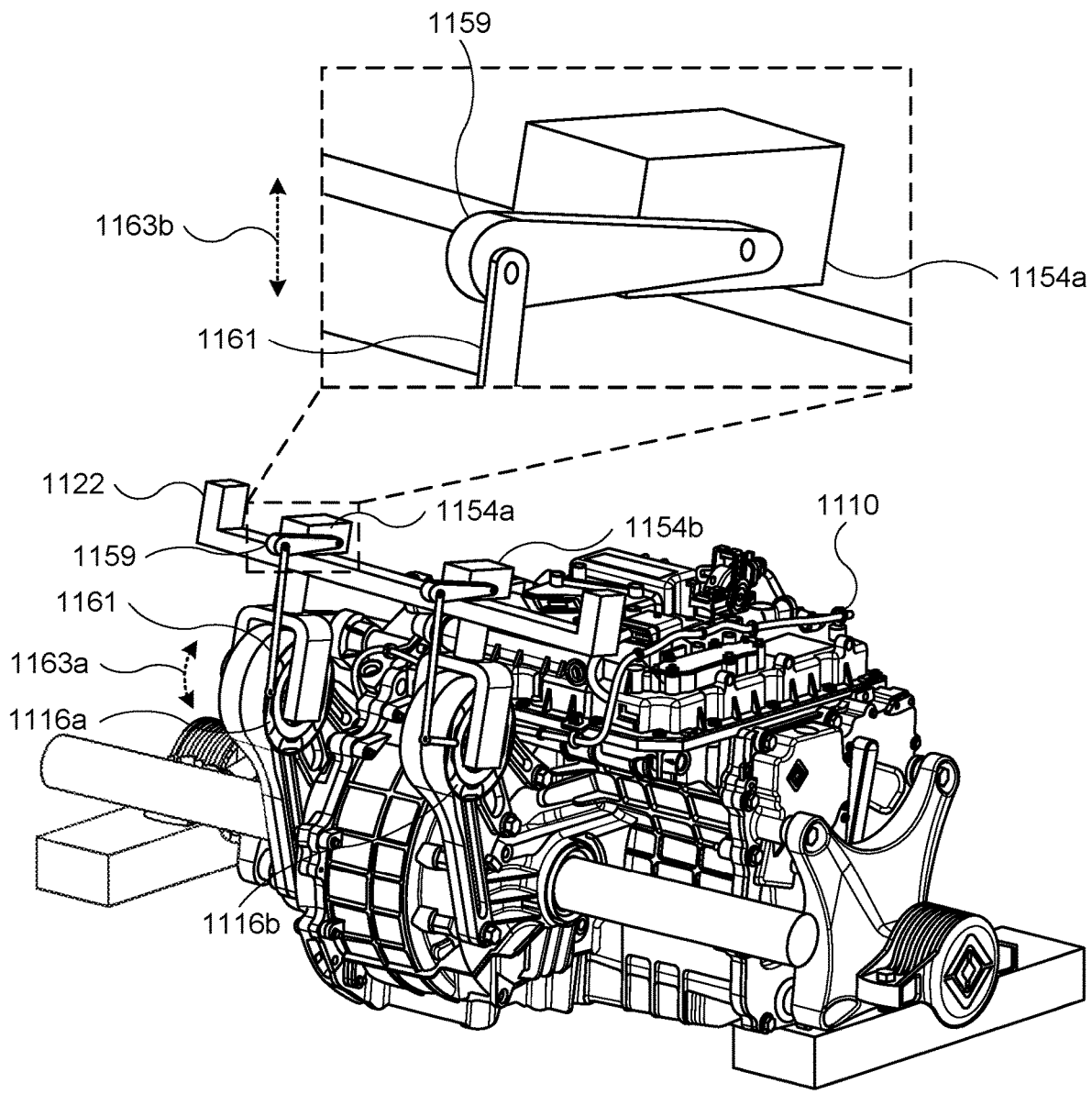
FIG. 12 illustrates an alternate embodiment of a measuring device located on, and designed to monitor, a drive unit, in accordance with aspects of the present disclosure.

Referring to FIG. 12 illustrates a measuring device 1154a and a measuring device 1154b used to measure displacement of a bushing 1116a and a bushing 1116b, respectively, coupled to a drive unit 1110. In some embodiments, each of the measuring devices 1154a and 1154b takes the form of a level sensor or height sensor. As shown, each of the measuring devices 1154a and 1154b is mounted a crossmember 1122. However, the measuring devices 1154a and 1154b may be mounted to other structural components of a vehicle.

As shown in the enlarged view, the measuring device 1154a may include an arm 1159 and a rod 1161 coupled to the arm 1159. The arm 1159 may include an actuator arm. The measuring device 1154a may track the movement of the arm 1159. The rod 1161 is coupled to the bushing 1116a. During operation of the drive unit 1110, displacement of the bushing 1116a (including a compound of the bushing 1116a) in either direction of a two-sided arrow 1163a may cause movement (e.g., linear movement) of the rod 1161 in either direction of a two-sided arrow 1163b, respectively. The movement of the rod 1161 causes a corresponding movement of the arm 1159. The measuring device 1154a may track the movement of the arm 1159. In this regard, movement of arm 1159 can be equated to the displacement of the bushing 1116a (including a compounding of the bushing 1116a). Thus, a vehicle management system (e.g., vehicle management system 514 in FIG. 6), having torque control, can determine displacement of the bushing 1116a based on data in the form of electrical signals obtained from the measuring device 1154a, and use the torque control can generate torque logic using the data from the measuring device 1154a. It should be noted that the measuring device 1154a is representative of the measuring device 1154b in terms of components and functionality, thus the measuring device 1154a may work in the same manner as described for the measuring device 1154a.

Figure 13:
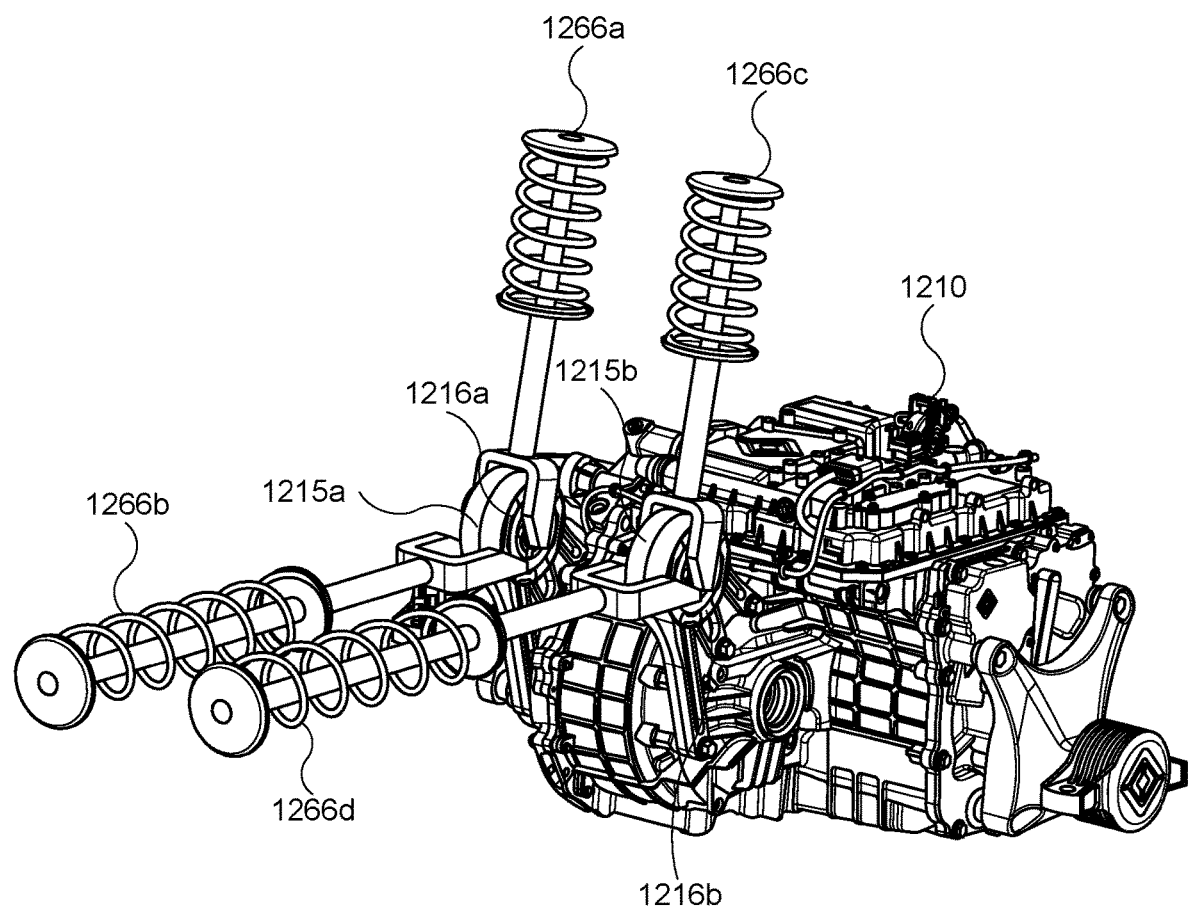
FIG. 13 illustrates an embodiment of a drive unit with several connectors used to monitor displacement of bushings, in accordance with aspects of the present disclosure.

Referring to FIG. 13, several connectors coupled to a drive unit 1210. For example, a connector 1266a and a connector 1266b are connected to a bracket 1215a that holds a bushing 1216a. Further, a connector 1266c and a connector 1266d are connected to a bracket 1215b that holds a bushing 1216b.

In some embodiments, the connectors 1266a, 1266b, 1266c, and 1266d are suspension modules. The connectors 1266a, 1266b, 1266c, and 1266d may take the form of struts with ball joints at each end. Further, the connectors 1266a, 1266b, 1266c, and 1266d may be used in a manner similar to that of an electronic suspension system. For example, each of the connectors 1266a, 1266b, 1266c, and 1266d can be adjusted (e.g., loosened or stiffened) based on received instructions. In this regard, when the drive unit 1210 begins to accelerate, a vehicle management system (e.g., vehicle management system 514 in FIG. 6) can receive information related to the acceleration of the drive unit 1210, and generate, using a torque control (e.g., torque control 550 in FIG. 6) torque logic that includes instructions to stiffen the connectors 1266a, 1266b, 1266c, and 1266d. By stiffening the connectors 1266a and 1266b, movement of the bracket 1215a is minimized, thus minimizing movement of the bushing 1216a. Similarly, by stiffening the connectors 1266c and 1266d, movement of the bracket 1215b is minimized, thus minimizing movement of the bushing 1216a.

Further, using multiple connectors on each bracket can provide stiffness in multiple directions at each bracket. For example, the connectors 1266a and 1266b can increase their stiffness along a respective axes or direction defined by the connectors 1266a and 1266b. Beneficially, as the drive unit 1210 accelerates, which is known to result in increased torque applied to the bushing 1216a (resulting in displacement of the bushing 1216a), the connectors 1266a and 1266b can receive torque logic from a torque control to stiffen, thus countering the torque output by the drive unit 1210 and limiting or preventing displacement of the bushing 1216a. Using similar torque logic in similar conditions, the connectors 1266c and 1266d can provide similar functionality for the bushing 1216b.

Figure 14:
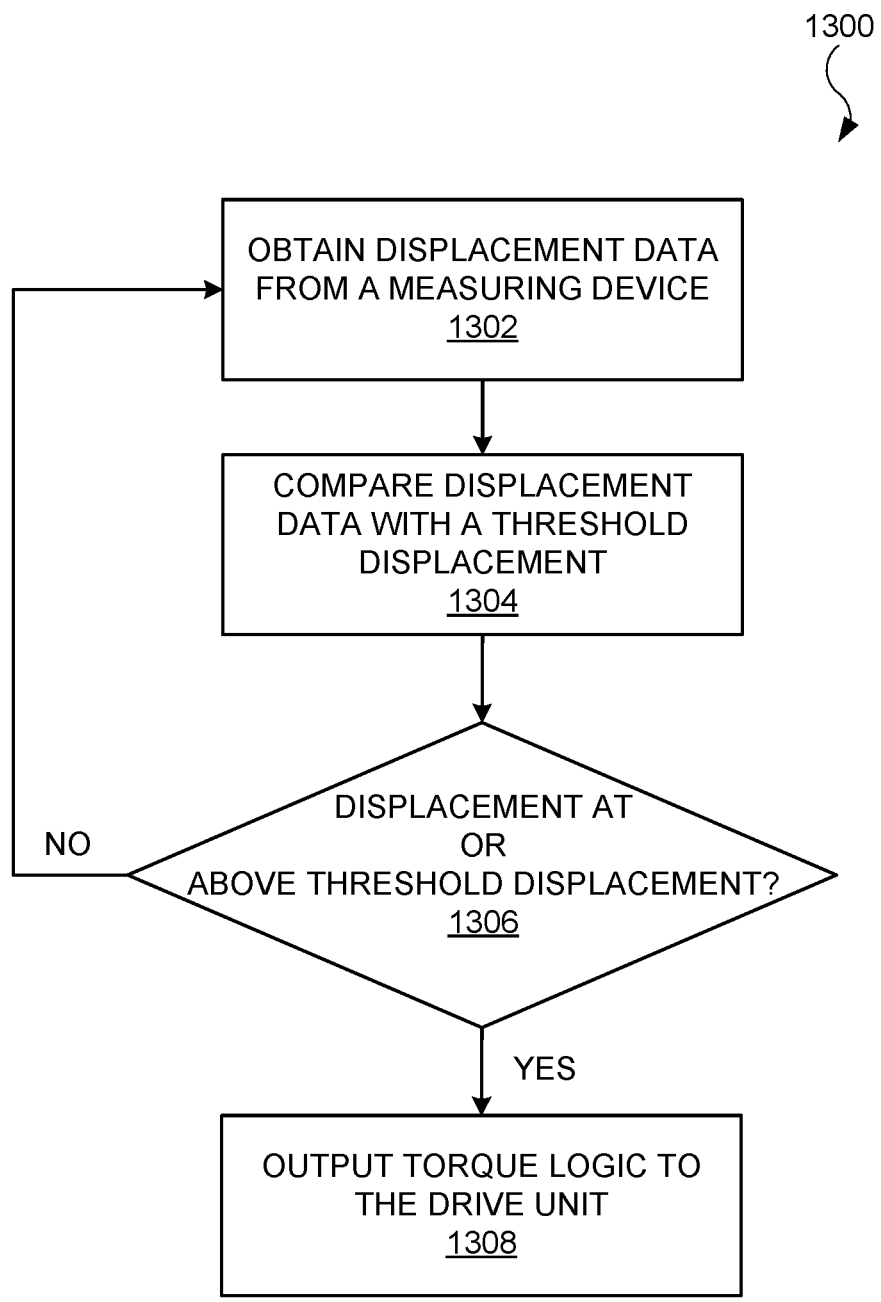
FIG. 14 illustrates a flow diagram for managing a vehicle, in accordance with aspects of the present disclosure.

Referring to FIG. 14, a flow diagram 1300 for managing a vehicle is shown. In particular, the flow diagram 1300 may be used to manage a drive unit (or drive units) of the vehicle by responding to displacement of a bushing. Further, the flow diagram 1300 may be implemented by a vehicle management system shown and/or described herein.

In step 1302, displacement data is obtained from a measuring device. The displacement data may include measurement information of a bushing of the vehicle. The bushing may be coupled with a drive unit of the vehicle. The measuring device may be selected from one or more of the measuring devices shown and/or described herein.

In step 1304, the displacement data is compared with a threshold displacement. The threshold displacement corresponds to a snubbing limit of the bushing.

In step 1306, a decision is made whether the displacement, provided from the displacement data, is at or above the threshold displacement. When the displacement data is below (e.g., not at or above) the threshold displacement, the flow diagram 1300 returns to step 1302, where new or updated displacement data is obtained from the measuring device.

When the displacement data is at or above the threshold displacement, the flow diagram 1300 continues to step 1308, where torque logic is output to the drive unit. The torque logic may include instructions that cause the drive unit to adjust the torque output (by the drive unit) by reducing the torque output.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A vehicle management system, comprising:
   a measuring device that measures a displacement of a bushing coupled to a drive unit; and
   a torque control configured to:
   obtain, from the measuring device, first displacement data corresponding to the displacement of the bushing,
   in response to the first displacement data indicating the displacement is at or above a threshold displacement, output, based on the first displacement data, torque logic to the drive unit, and
   control, based on the torque logic, a torque output of the drive unit.

2. The vehicle management system of claim 1, wherein the torque control is further configured to:
   generate, based on the first displacement data, an analytical model of the bushing, and
   adjust, based on the analytical model, the torque logic.

3. The vehicle management system of claim 2, wherein the torque control is further configured to:
   store the first displacement data as historical displacement data,
   obtain, from the measuring device, second displacement data,
   update, based on the historical displacement data and the second displacement data, the analytical model, and
   update, based on the updated analytical model, the torque logic.

4. The vehicle management system of claim 2, wherein the torque control is further configured to:
   obtain a characteristic of the bushing, and
   generate the analytical model based on the characteristic.

5. The vehicle management system of claim 1, wherein the measuring device comprises a strain gauge.

6. The vehicle management system of claim 1, wherein the measuring device comprises a camera configured to capture an image of the bushing.

7. The vehicle management system of claim 1, wherein the measuring device comprises:
   a coil coupled to the bushing; and
   a magnet, wherein:
      relative movement between the coil and the magnet induces an electrical current in the coil, and
      the first displacement data comprises a value of the induced electrical current.

8. The vehicle management system of claim 1, wherein the measuring device comprises an actuator configured to:
   measure the displacement of the bushing, and
   generate the first displacement data based on the displacement.

9. The vehicle management system of claim 1, wherein:
   the measuring device comprises a sensor that monitors a movement of the drive unit, and
   the displacement of the bushing is determined based on the movement.

10. The vehicle management system of claim 1, wherein the vehicle management system is implemented in a vehicle.

11. A method for managing a vehicle, the method comprising:
   monitoring, by a vehicle management system, a displacement of a bushing;
   comparing, by the vehicle management system, the displacement with a threshold displacement;
   in response to the displacement being at or above the threshold displacement, outputting, by the vehicle management system, torque logic to a drive unit; and
   control, based on the torque logic, a torque output of the drive unit.

12. The method of claim 11, wherein the torque logic causes operating of the drive unit to maintain the bushing at or below the threshold displacement.

13. The method of claim 12, wherein the torque output is applied to a wheel coupled to the drive unit.

14. The method of claim 11, wherein monitoring the displacement comprises measuring, by a measuring device, the displacement.

* * * * *